Nov. 11, 1969 H. R. OETERS ETAL 3,478,325

DELAY LINE DATA TRANSFER APPARATUS

Filed Jan. 16, 1967 8 Sheets-Sheet 1

INVENTORS
ANDREW W. MAHOLICK
HAROLD R. OETERS

BY William N. Barret

ATTORNEY

Nov. 11, 1969 H. R. OETERS ET AL 3,478,325

DELAY LINE DATA TRANSFER APPARATUS

Filed Jan. 16, 1967 8 Sheets-Sheet 4

SHIFT REGISTER CONTROL

United States Patent Office 3,478,325
Patented Nov. 11, 1969

3,478,325

DELAY LINE DATA TRANSFER APPARATUS

Harold R. Oeters and Andrew W. Maholick, Raleigh, N.C., assignors to International Business Machines Corporation, Armonk, N.Y., a corporation of New York Filed Jan. 16, 1967, Ser. No. 609,507

Int. Cl. G11b *13/00*

U.S. Cl. 340—172.5 11 Claims

ABSTRACT OF THE DISCLOSURE

A serial by bit data storage device, e.g. magnetostrictive delay line, with a read-write circuit for receiving data from the delay line and rerecording this same data into the delay line with a shift register connected in parallel to the read-write circuit to receive data from the delay line and selectively staticize portions of the same to effect a transfer of a plurality of data bits from the register simultaneously. The shift register includes circuitry for accepting a plurality of bits simultaneously and means for selectively shifting these data bits into the delay line in correct time relation with data already contained therein as determined by control bits in the data.

Background

Between low speed data transmission devices and high speed data transmission devices, it is necessary to utilize an intermediate data storage device or buffer for accumulating data available at a low data rate for transmission at a high data rate and conversely to receive at a high data rate for transmission at a low data rate. These type devices take many forms, such as a magnetic storage drum containing an area for the receipt or transmission of data at a data rate equal to the data rate of a connected peripheral unit. The exchange from this area is with the main storage area of the drum and at drum processor data rate. These same type devices have been used with various core storage devices to effect the same type of transition.

Serial delay lines utilizing the same concept including magnetic drum storage can be used for the same purpose. Data bits are entered serially into the delay line or extracted serially from the delay line a single bit at a time dependent on the peripheral device. For high speed transfer the data bits are transferred serially at delay line repetition frequency into or out of the delay line.

For this particular invention, it was necessary to exchange data between peripheral devices which transmit or receive data by bit while the processor transmits or receives data by byte (eight bits in parallel).

Applicants' invention thus differs significantly in functional requirements from the devices described as background. The transfer between slow speed devices and buffer is serial and periodic while the transfer between buffer and processor is parallel by bit and aperiodic, i.e. it depends upon the control of the processor and is dependent upon the processor, and not upon the buffer. The problem is to provide appropriate control apparatus to select the data positions of the delay line between which data is to be transferred parallel by bit and the apparatus for accomplishing this parallel transfer.

A delay line with accompanying electronic circuitry provides a data storage device with data being continuously recirculated through the delay line, and electronic circuitry, and reentered into the delay line to form a continuous data stream with data being selectable based on the timed relationship of the same to the electronic circuitry. The data being dynamically transferred within this loop is fixed in a time base as established by an electronic timing ring. To advance the data within the time base, the delay introduced by the electronic circuitry is shortened so that reentry into the delay line at an earlier time effects a shift operation.

Data by bit from peripheral devices is introduced into the lowest order position of the delay line. Data by bit is transferred from the highest order position to a connected peripheral device.

A high speed data processor is connected to receive or enter data from the delay line in parallel groups of 8 bits (in this particular example). The transfer to be made cannot be fixed in time so that the movement of data within the delay line resulting from the interchange with peripheral devices by bit necessitates a control which constantly monitors the bit transfer and provides indicia for effecting the parallel transfer of data between processor and delay line at the time chosen by the processor for this transfer. The problem then is to provide control circuitry to establish between which data positions of the data in the delay line the data transfer is to be made when the processor makes the transfer.

The present invention provides within the recirculating data loop, control information which includes a bit position indicator to indicate the location within the delay line between which a transfer is to be made and a control group which indicates that service of the delay line is required. The bit position indicator and control group within the circulating data loop are modified as data is serially entered or read from the delay line.

Summary of the invention

A shift register is connected to receive serial by bit data being recirculated in delay line each time the same is read therefrom into electronic circuitry and reentered into the delay line. This shift register contains as many stages of storage as are required for the number of bits to be readin or readout in parallel. The data read from the delay line is shifted into the register and the data is shifted until a pedetermined group of data established by the bit position group is standing in the register. The shifting operation is then terminated and a parallel transfer effected from the register if a transfer of data is required as established by the control group. The recirculating data is not effected by this readout. Upon transfer of data, the control group is reset.

In the transfer of data into the delay line in parallel from the processor, the eight bits are entered into the shift register and the shift register connected to the reentry circuitry of the delay line properly timed to effect recording in the recirculating data loop immediately adjacent the data which is prior in time. Upon entry of data into the delay loop the control group is reset.

In the instance of either readin or readout to the processor, the bit position control is being constantly changed in response to the operation of serial bit transfer out of or into recirculating delay loop.

It is therefore an object of the present invention to provide apparatus for effecting a data transfer between a peripheral device which transmits and receives units of data periodically and a processor which transmits and receives multiple units of data aperiodically.

The foregoing and other objects, features and advantages of the invention will be apparent from the following more particular description of a preferred embodiment of the invention, as illustrated in the accompanying drawings.

Description of drawings

FIGS. 5A, 5B and 5C show when combined a circuit diagram of the base write control.

Description of the preferred embodiment

Figure 1:
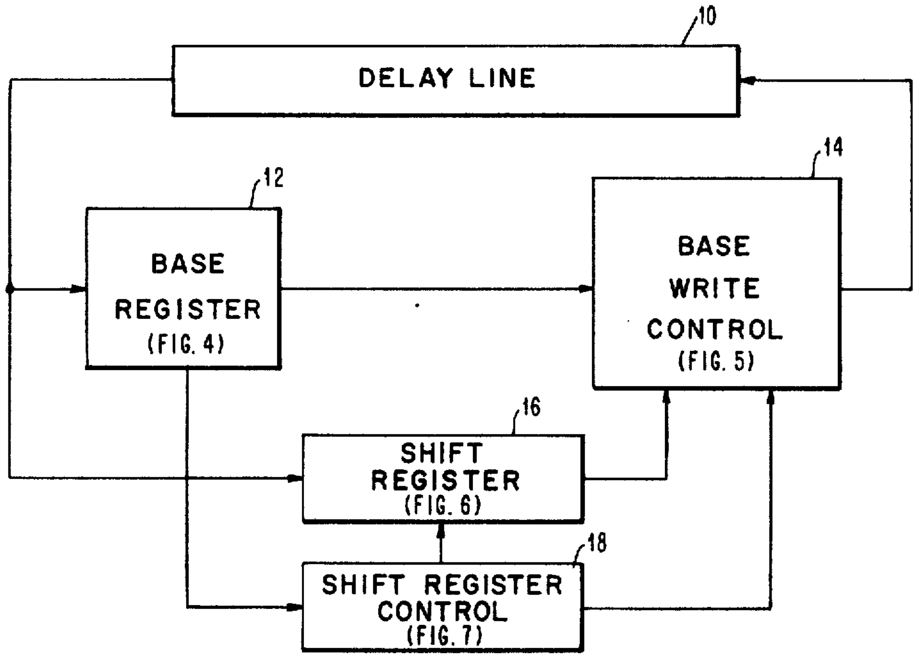
FIG. 1 is a schematic illustration of the functional units utilized for the invention.

FIG. 1 is a schematic illustration of the functional units and theilr interconnection as used to implement the present invention. As shown there is a delay line for the serial storage of bits of data. This is preferably of the magnetostrictive type but could be, for example, a magnetic drum. Data from the delay line is transferred serially to a base register 12, FIG. 4, where the same is statically retained for a complete time cycle of nineteen time periods, in this particular example, to retain momentarily twenty bit positions of data. The twenty bits of data in the base register are recorded serially in correct time sequence in the delay line through a base write control 14, FIG. 5A in the next successive cycle of twenty time periods.

A shift register 16 is connected to the delay line 10 and receives data concurrently with the receipt of data into the base register 12. The shift register is also connected to the base write control 14. The shift register is enabled under control of a shift register control 18, FIG. 7, which is responsive to a bit position group and a control group within the data being circulated.

Figure 2:
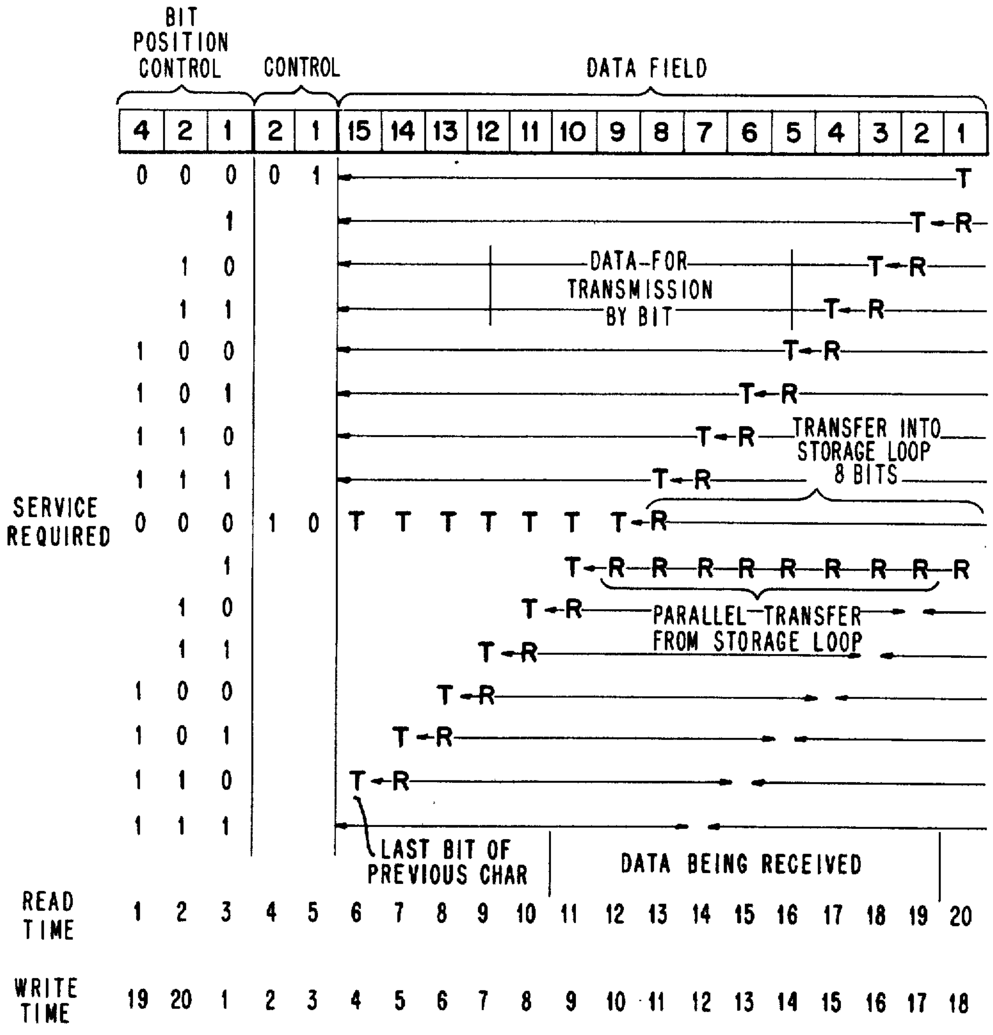
FIG. 2 is a combined timing and circulating data flow diagram.

Prior to explaining the details of the actual implementation of the invention, a review of the data format as shown in FIG. 2 will be helpful. As shown in FIG. 2, there is a bit position group consisting of three bits for a binary designation (000–111) (decimal 0–7) to designate a particular group of bits in which a byte of data is contained for transfer to the processor if receiving or in which the processor may insert a byte of data when transmitting to the peripheral device. A control field designates whether the above group of bits is in the lower or upper half of the field. This control field being in 10 state is used to signal the processor that additional data is required or that data has been accumulated within the delay line requiring a readout to the processor. Upon transfer of data, the processor changes the control field to 01.

Data is recirculated in the following sequence: bit position control, control, and the data field thereafter. As discussed previously, data is recorded in the data field by bit from slow speed devices; and data is read from the data field by bit to the slow speed devices. Data is transferred to the slow speed devices from the high order position of the data field while data is transferred from the slow speed device into the low order position of the data field. For an 8 bit byte, data is inserted into Data Field position 1. For a 7 bit byte, data s inserted into Data Field position 2 and for a 6 bit byte, data is inserted into Data Field position 3.

Assuming that data is being transmitted to the peripheral device, the data field is first filled (positions 1–15). In FIG. 2 assume that with bit position control 000 and control at 01, the data field 15–1 is completely filled with data. As the peripheral device accepts data bits from the high order, the entire data field is shifted. This has been indicated in FIG. 2 by the T's signifying the last data bit in the data field shown moving toward the left across the figure indicating that as the data is extracted from the delay line, the last bit in the field is actually progressing toward the high orders in the data field. This progression of data in the data field is indicated by the bit position control.

The bit position control field includes the highest digit position within the data field which does not include viable data in an operation wherein data is being transmitted to a peripheral unit or the highest order bit position containing viable data wherein data is being received from a peripheral device.

In the middle portion of FIG. 2 a legend "Service Required" indicates a control group binary 10 which is an indication to the data processor that data can be transferred into the data field or be transferred from the data field. The transfer between delay line and processor is in eight parallel bits (a byte) of data.

The character T and data in higher order positions designates data within the data field to be transferred to the peripheral device. The character R and data in lower order positions designates data being accumulated from the peripheral device.

At the lower portion of FIG. 2 are two sets of time designations, which correspond to the time that data is read from the delay line into the base register 12 and the time that data is read from the base register to the write delays (on the following cycle). Write time is earlier than read time in order to free register for next control word.

Detailed description

Figure 4:
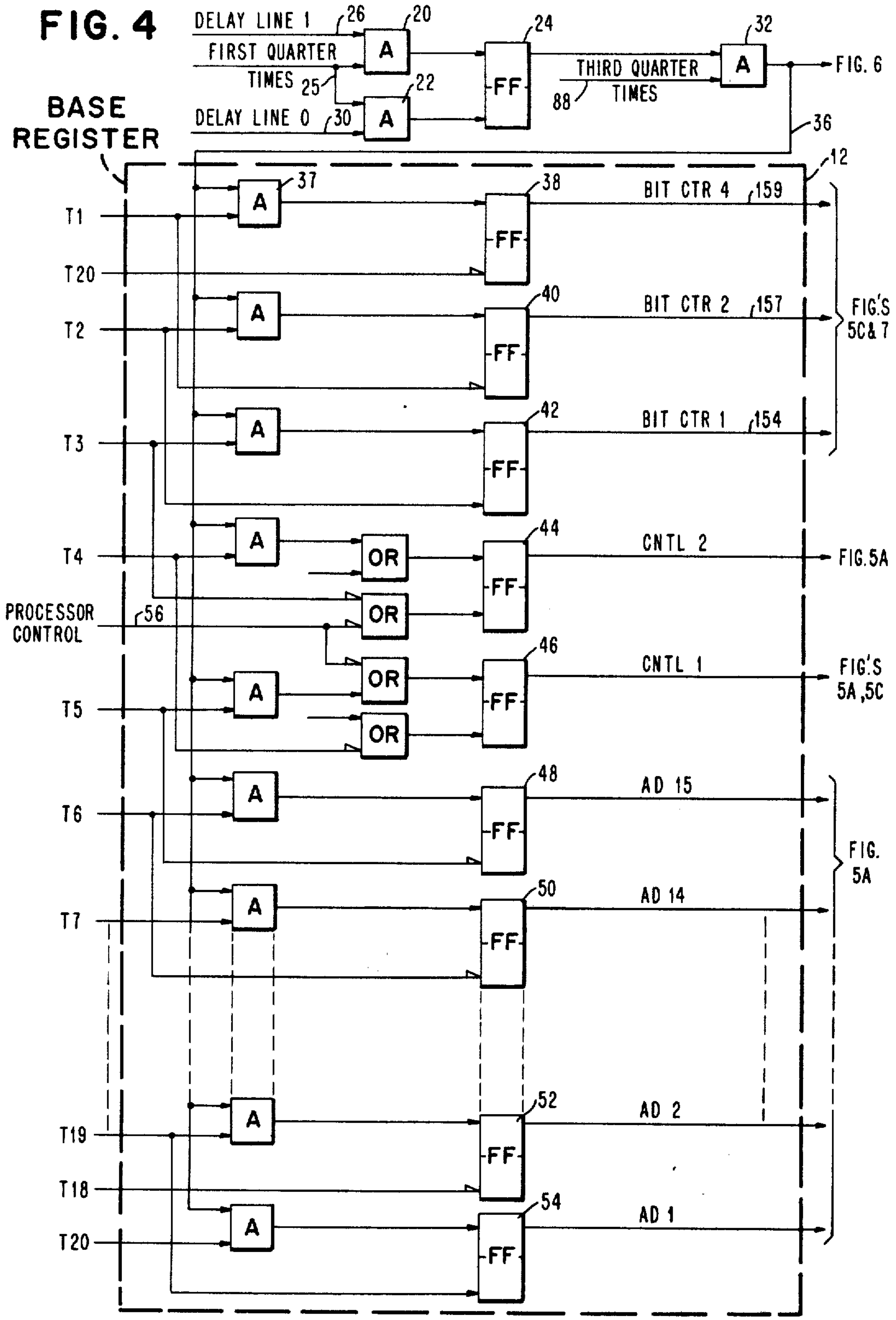
FIG. 4 is a circuit diagram of the base register.

Data from the delay line 10 is sensed by a suitable detecting apparatus (not shown) to provide an output at 26 or at 30, FIG. 4, depending on whether the data detected is a 1 or a 0. A timed gating input at first quarter time 25, conditions AND circuits 20 and 22. The AND circuit enabled provides an output respectively to either the set or reset input of a bistable device 24. When there is a binary 1, gated at first quarter time, the bistable device will be set and provide an output to an AND circuit 32. This AND circuit 32 at three quarter time, input 88, will provide an output on a line 36. When there is a binary 0 from the delay line at first quarter time, the output of AND circuit 22 will reset bistable device 24 and there will be no output on line 36 at third quarter time.

The data bits in the recirculating data field as shown in FIG. 2 are staticized in time by the bistable devices 38 through 54, one being provided for each bit position of the data field. It should be noted that many of these bistable devices have been omitted for the purpose of brevity.

Bistable device 38, for example, like all the other devices, with the exception of 44 and 46 to be presently described, are set by an AND circuit such as 37 connected to the input line 36 and timed by a timed pulse T1. At T1 time, any bit present as a signal on line 36 is used to set the bistable device 38. This bistable device 38 stores the bit control four for the bit position control field. The remaining bistable devices are set at times, as shown. The reset for a bistable device such as 38 occurs just prior to the time the bit is due on line 36, in the case of bistable device 38 at T20 time. Thus, the data is read during one cycle, times T1 through T20, and, as the last data from the data field is stored in the bistable device 54 T20 time (bit position 1), bistable device 38 is being reset, in order to be able to receive the next data field being read from the delay line.

Bistable devices 44 and 46 have additional controls. There is an input circuit 56 for setting the bistable devices 44 and 46 to indicate binary 0 and binary 1 respectively. These devices which contain the control group are reset from binary 10 to binary 01 after a parallel transfer of eight bits has been made with the processor. Note that the control bit position group is not changed by the processor, only the control group.

Figures 5, 5A:
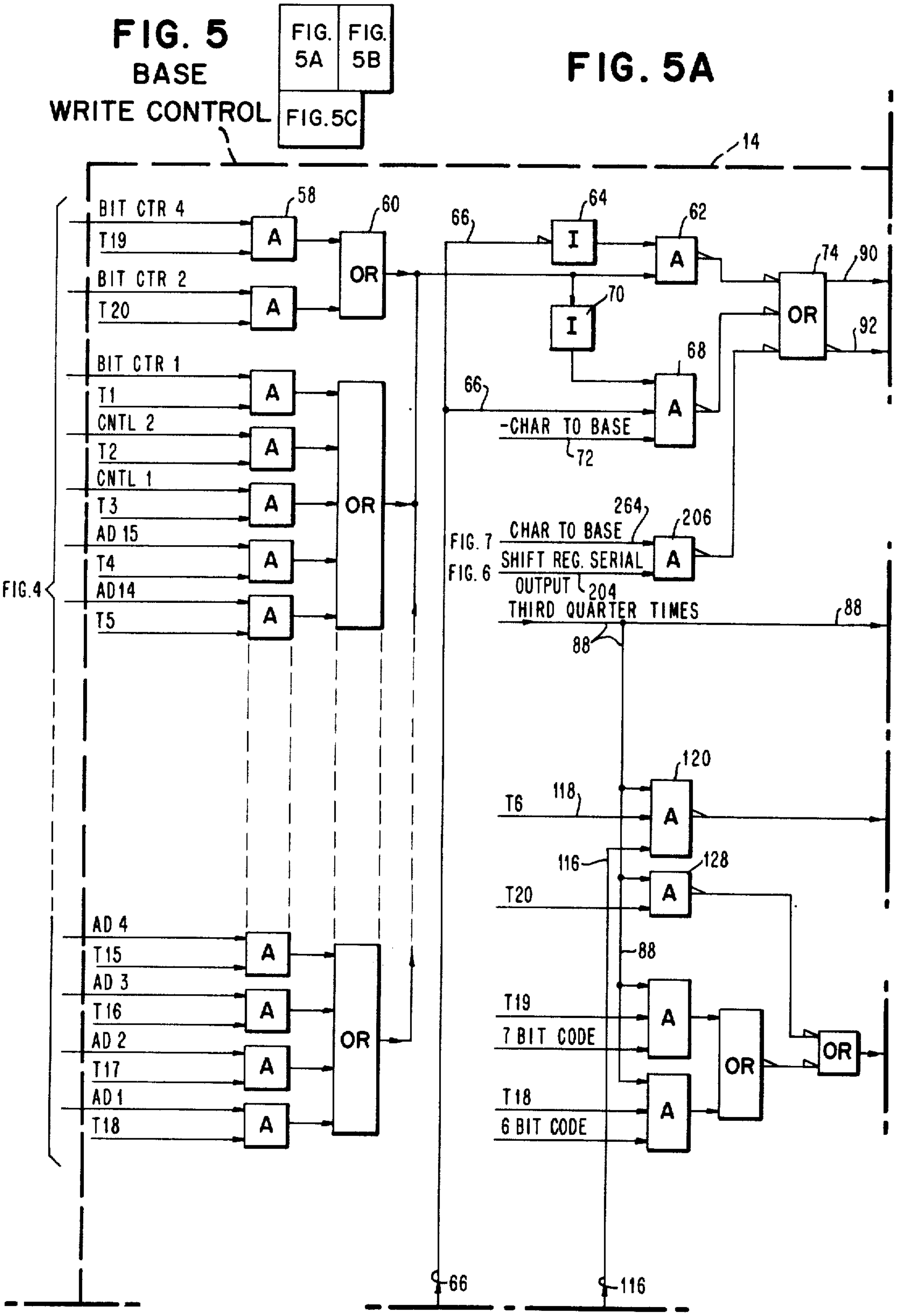
FIG. 5 is a diagram of how
FIGS. 5A, 5B and 5C are to be joined together.
Figure 5B:
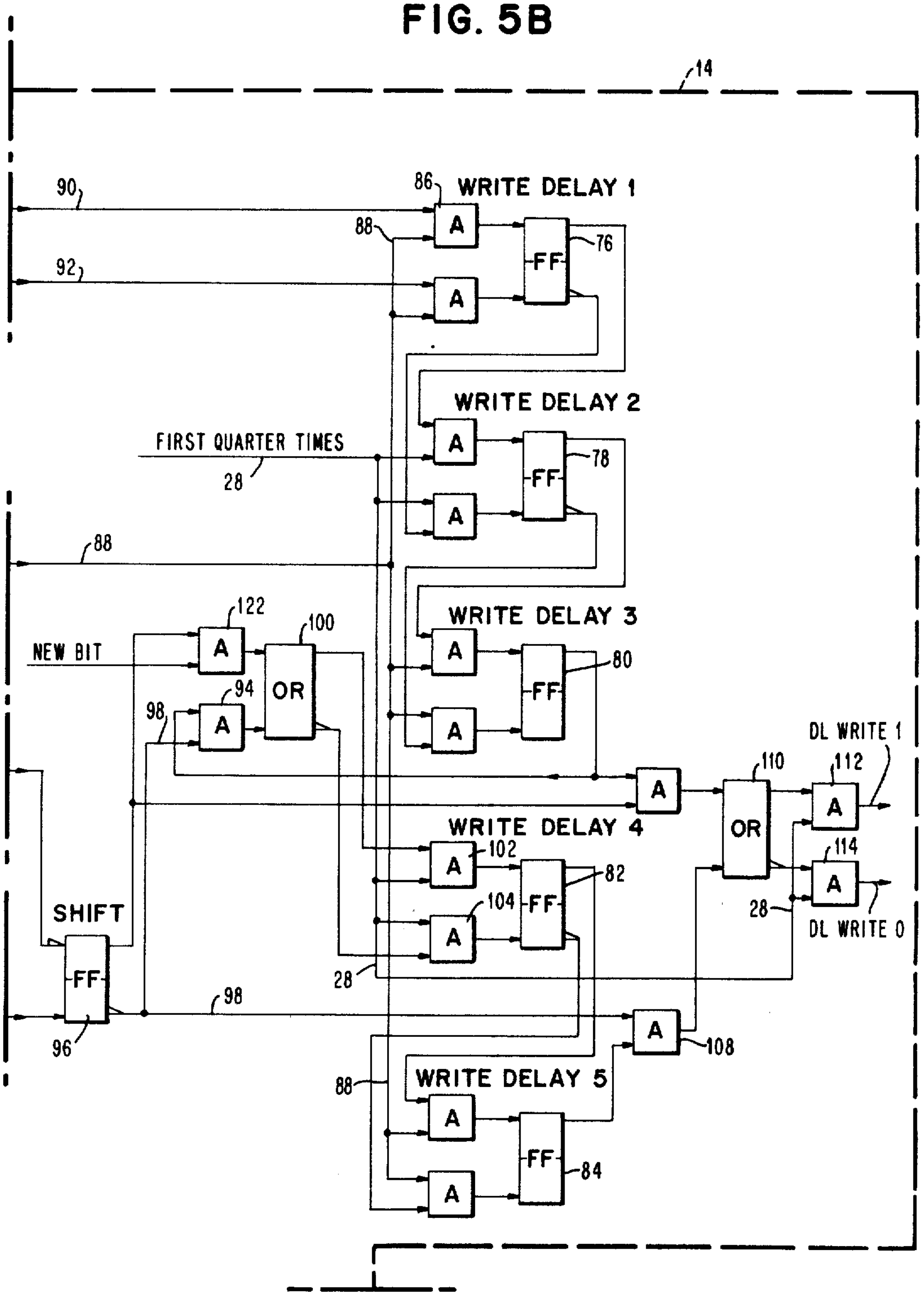
Figure 5C:
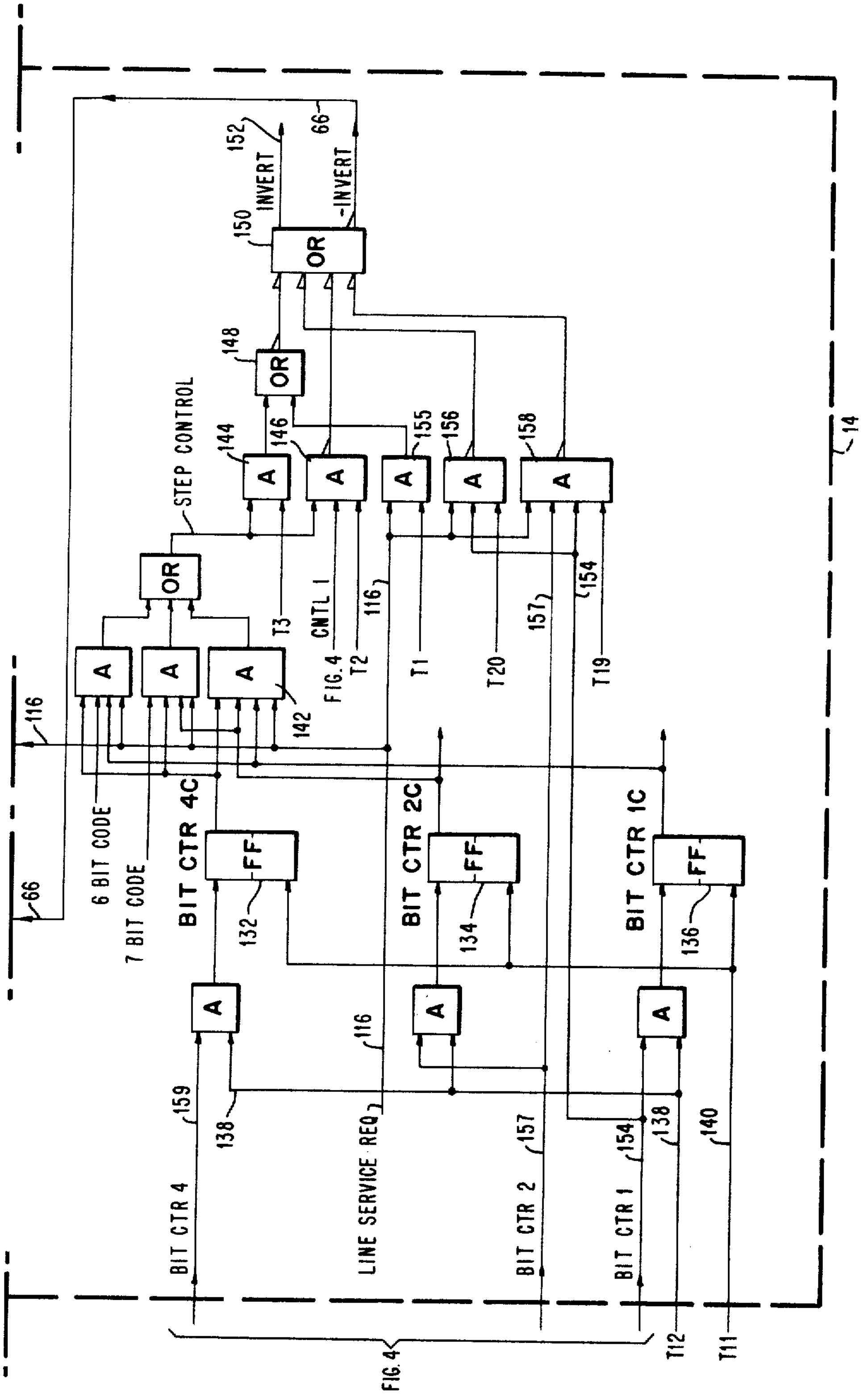

From the base register 12, FIG. 4, data is transferred through the base write control 14, FIGS. 5A, 5B, 5C. The data from bistable devices 38 through 54 is transferred to the AND circuits such as 58, FIG. 5A, appropriately labelled as to its significance within the data field. The data transfer from base register 12, FIG. 4, is timed by inputs to AND circuits, such as 58, in order to correctly record the same in the delay line. For example, the bit control 4 data is connected to AND circuit 58 which is timed by a time signal at T19, see also FIG. 2. Data from the remainder of the field is timed appropriately and applied through OR circuits such as 60, to an AND circuit 62. Also connected to the AND circuit 62 is an output from an inverter 64 providing an output inverse to that appearing on input 66. Input 66 is also applied to an AND circuit 68 to which the output of an inverter 70 is applied. This AND circuit 68 is also conditioned by an input on line 72. There is a positive signal on line 72 except when a byte is to be transferred from the processor into the delay line. When a character is to be transferred, the line 72 is negative and the AND circuit is disabled.

Data ordinarily passes through AND circuit 62 from the delay line and the base register, to a series of Write Delay Bistable Devices 76–84.

These bistable devices 76, 78, 80, 82 and 84 form a data transfer chain wherein data is transferred sequentially from one delay bistable device to the next succeeding bistable device. When it is desired to shift data in the data field, the delay is shortened thereby recording at an earlier time than the data was read.

A bistable device such as 76 includes the bistable device 76 and an AND circuit such as 86 for setting the same to a "1" condition in the presence of the input from the OR circuit 74 enabled at three quarter time by a pulse on line 88. The device is reset to a "0" condition by the presence of a pulse on line 92 which is positive when no input has been presented to the input of the OR circuit, i.e. a "0" indication.

When there is a signal on line 90 there is no signal on line 92. Thus the bistable device 76 assumes a "1" condition or a "0" condition for each time period T1–T20 depending on the output of OR circuit 74. The OR circuit 74 and other circuits are shown with a half arrow output. This designates the presence of a negative output. For OR circuit 74, any input provides an output on line 90 and 92 (92 being negative to 90). Similarly, when no inputs are present, output 92 is positive. The OR circuit 74 is shown with negative input conditions to provide an OR function with positive output 90.

An OR circuit with positive input supplies a positive and/or negative output in the presence of any input; or in the absence of any input a negative and/or positive output (as shown by the arrow). A negative input to the set side of a flip-flop or bistable device, indicates the same is set by a negative input. The output at the top of the box indicates the signal obtained when the logical designation is satisfied. If additional outputs are provided, their designation is also indicated as being present when the logic condition is satisfied.

Details of these logic blocks are conventional and no necessity is seen to show the details of the same particularly. Thus the negative OR circuit with negative output is a positive AND while the negative AND with negative output is a positive OR. Where an output of opposite potential is required, an inverter is included.

The information entered into the bistable device 76 at third quarter time is shifted into the bistable device 78 at first quarter time of the next time period. Similarly at third quarter time of this same time period, the bistable device 80 receives the contents of the bistable device 78. This process continues with the "1" output of the bistable device 80 being supplied to an AND circuit 94 which is enabled by the "not" output line 98 of a bistable device 96. This circuit provides a positive output signal on line 98 when no shift is to be made in data.

If the bistable device 80 contains a "1," the output of OR circuit 100 sets bistable device 82 and the data is shifted through device 84, AND circuit 108, OR circuit 110 to circuit 112 and 114 utilized for writing a "1" or "0" respectively into the delay line. The AND circuits 112 and 114 are appropriately gated by first quarter time pulses, line 28.

In those instances where a shift operation is required, there will be pulse signal on a line 116, "Line Service Request," FIGS. 5C and 5B, from the peripheral device designating a bit transfer to or from the delay line. This signal is gated at time T6 and third quarter time by an AND circuit 120, FIG. 5A. With all signals present, the AND circuit 120 is enabled to set a bistable device 96, "Shift" FIG. 5B. The output of the device 96 enables the AND circuit 122, which in those cases where a new bit is being transferred from the peripheral device, will be enabled. In other words, the bit to be transferred into the delay line is presented to the AND circuit 122 by the peripheral device on the new bit line. This bit will be written into the delay line at time T1 at first quarter time as a result of the output of AND circuit 128 resetting "Shift" device 96. The "not" output of device 96, line 98, is applied to AND circuit 108 which times the transfer of the data stored previously at times T7 thru T20 in the bistable device 82 and subsequently shifted into device 84. For data transfers of seven bits or six bits into or out of the delay line it is necessary to time the reset of the shift device 96 as shown in FIG. 5B at T19 or T18 time respectively.

Each time a bit or no bit ("1" or "0") is to be entered into the delay line or taken therefrom, the "Line Service Request" 116 provides a signal which initiates the change of the data in the bit position control and also in the position control if necessary.

Bit position control data from devices 38, 40, and 42, FIG. 4, sets bistable devices 132, 134, and 136, FIG. 5C, at time T12 as determined by input 138. These devices were reset at T11. The output of these bistable devices is applied to an AND circuit 142 in order to change the pattern of the control group. In the presence of a "Line Service Request" 116, and with each device 132, 134 and 136 providing an output indicating a binary 111 (seven decimally) the AND circuit 142 is enabled and an output supplied to AND circuits 144 and 146. For 6 or 7 bit codes, AND circuits 144 and 146 are conditioned when the devices 132, 134, and 136 provide an output of 110 and 101 respectively. Each of these AND circuits is appropriately gated at time T3 and T2 corresponding to the control bit write pattern as shown in FIG. 2. The time T3 is the low order portion of the control while T2 is the high order. A change is effected in the high order position 2 (time T2) by enabling the output of AND 146 at T2 time which is transferred through OR circuit 148, OR 150 to an output 66. The output 66 is connected to AND 62 through inverter 64. AND circuit 62 receives the output from the base register and the high order position 2 is changed to the converse by the operation of inverter 64 with AND 62. The lower order is changed utilizing AND 146 which provides an output at T2 time when the input conditions are satisfied.

The apparatus for modifying the bit position control data includes, FIG. 5C, a series of circuits 155, 156, and 158 which are used with the Line Service Request output 116. At times T1, T20, and T19, which are equivalent as will be noted from FIG. 2, to the record times for the bit position control, the contents of the bit control devices, FIG. 4, are sampled by AND's 155, 156 and 158 and the data presented to AND circuit 62 modified, if required, if there is a Line Service Request. For each Line Service Request 116, the lowest order "1" of the bit position control is supplying an output from OR circuit 148; OR 150 to invert block 64, FIG. 5A. Data in order "2"

time T20, see FIG. 2, is changed if bit control 1, device 42 is set a "1." Data in order 4 is changed if data in the orders "2" and "1" are present and there is a Line Service Request. The change is effected through the output on line 66, as discussed previously. The philosophy of the counters is to store high order position first. If at the time of storing, all lower order positions are on invert, the position being stored.

Figure 7:
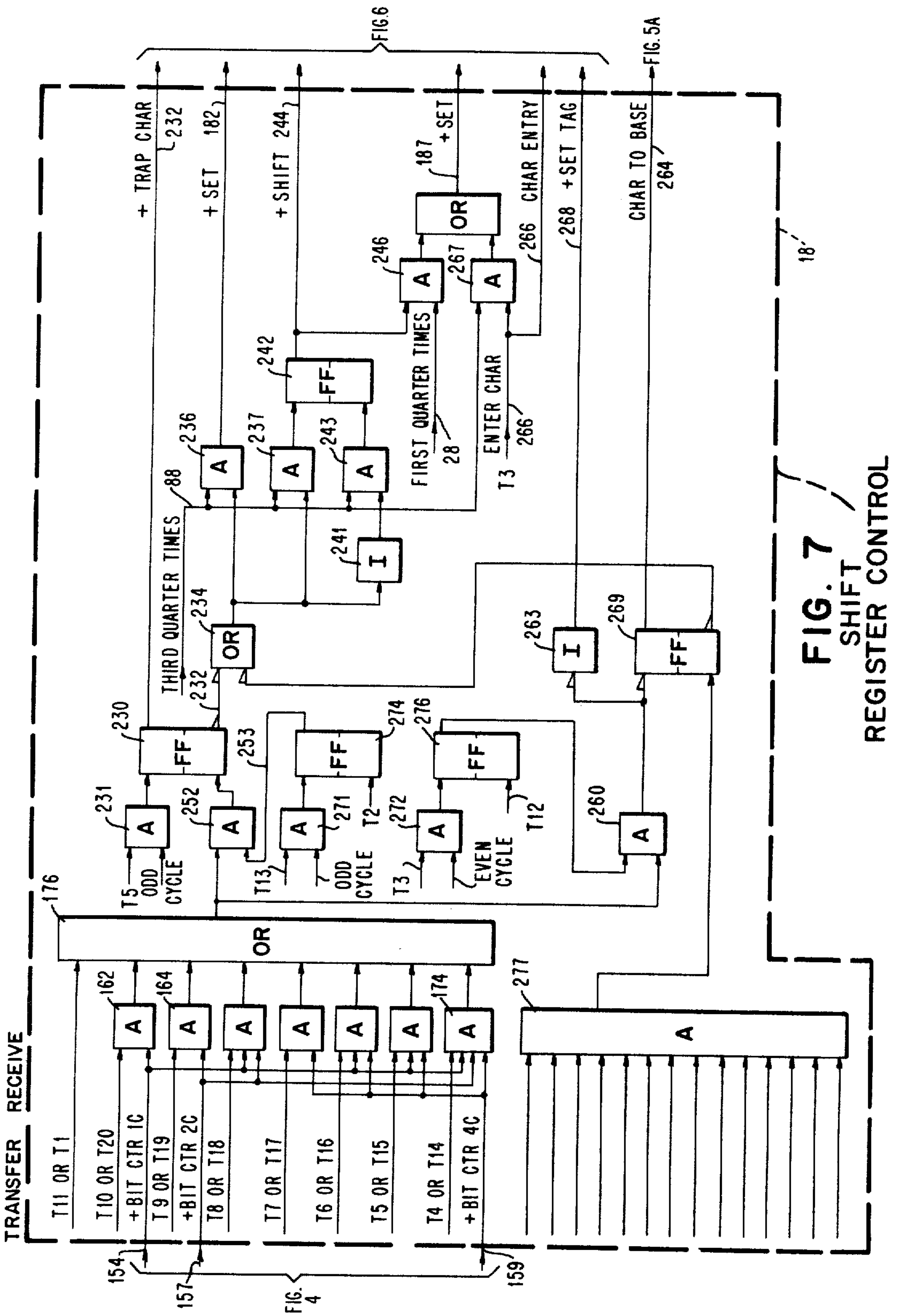
FIG. 7 is a circuit diagram of the shift register control.

The Shift Register Control 18, FIG. 7, includes a series of AND circuits 160, 162, 164 through 174 which are enabled, as shown, by the outputs from the bit control devices 132, 134 and 136, FIG. 5C, containing bit position control data.

As it will be remembered from FIG. 1, the shift register 16 receives data from the delay line every other time the data is passed from the delay line to the base register. This connection from the delay line is shown at 36, FIG. 4. The data is transferred to an AND circuit 240, FIG. 6, enabled by an input 232 from the shift register control to be described subsequently; an OR circuit 242; and an AND 243 or 245, dependent on whether the data is a binary "1" or "0," to set the bistable device 180 to a "1" or "0" by application of the input to the set or reset terminal.

Data is shifted through the register by enabling AND circuit 184 by a shift signal on line 244 which conditions device 186 which in turn sets reset device 188 when line 187 is activated. The output of 188 is in turn shifted to device 190, 191 etc. 200, 202 to the output 204 which is connected to the AND circuit 206 in the Base Write Control, FIG. 5A.

Data from the delay line or into the delay line from the processor is in eight, seven or six bit bytes depending upon requirements. This data transfer is effected through the shift register 16, FIG. 6. While there are only three stages of the shift register shown, there are a total of eight. The bistable devices 188, 191 etc. 202 are three of the eight output devices used to transfer data to the processor. The data within the delay line is shifted through the shift register until such time as the proper eight bit byte is standing in the devices 188, 191 etc. 202 wherein appropriate controls, to be subsequently discussed are brought into operation to terminate the shift operation thereby staticizing the character for transfer to the processor. For seven or six bit bytes, the processor will ignore the bit in devices 188 or 188 and 191 respectively.

Data from the processor is entered into the shift register through AND circuits 185, 221, . . . 223, consisting of the necessary eight bit byte to set the devices 188, 191, . . . 202. At the appropriate time, the shifting operation is enabled to move this data into the revolving data being recirculated within the delay line.

The controls for the shift register will be discussed in relation to the Shift Register Control 18, FIG. 7.

Data is read from the delay line 10 into the base register, FIG. 4, in a given time cycle and reread into the delay line on the subsequent time cycle.

In the utilization of the shift register for the entry and readout of data alternate time cycles are used so that data is read from the delay line into the shift register and taken therefrom in an ODD cycle and data is entered into the shift register for rereading into the delay line on an even cycle.

In FIG. 7, this timing relationship is developed as follows: For readout of data from the delay line in parallel bit groups, it is necessary to staticize the shift register when the first bit of the data byte to be transferred (highest order) is standing in device 202, FIG. 6. For a specific example, consider FIG. 2 with this bit in position 9 (bit position control 001). The time when this data position and the succeeding seven positions are in will be time T19. The times of transfer of a byte of data in digit positions 15–8, 14–7, 13–6 . . . 8–1 are T13–T20 respectively. This is shown in FIG. 7 by the legend "Receive" over these times.

When data is to be transferred to the delay line, the indicia of the bit position control is referrable to the bit position adjacent the last bit of untransmitted data. Referring to FIG. 2, for the example shown, it can be seen that the time specified is from T4–T11 for initiating the readin of data from the shift register to the write control immediately following data in digit positions . . . 15, 14, 13 . . . 9. These times are shown in FIG. 7 with the legend "Transfer."

As mentioned previously, the times of occurrence of particular data positions are associated particularly with the data by the series of AND circuits 162–174 and an output provided through an OR circuit 176 to 252 to reset a bistable device 230. It is the reset of this device 230 which initiates the staticizing of the data passing through the shift register from the delay line.

Figure 6:
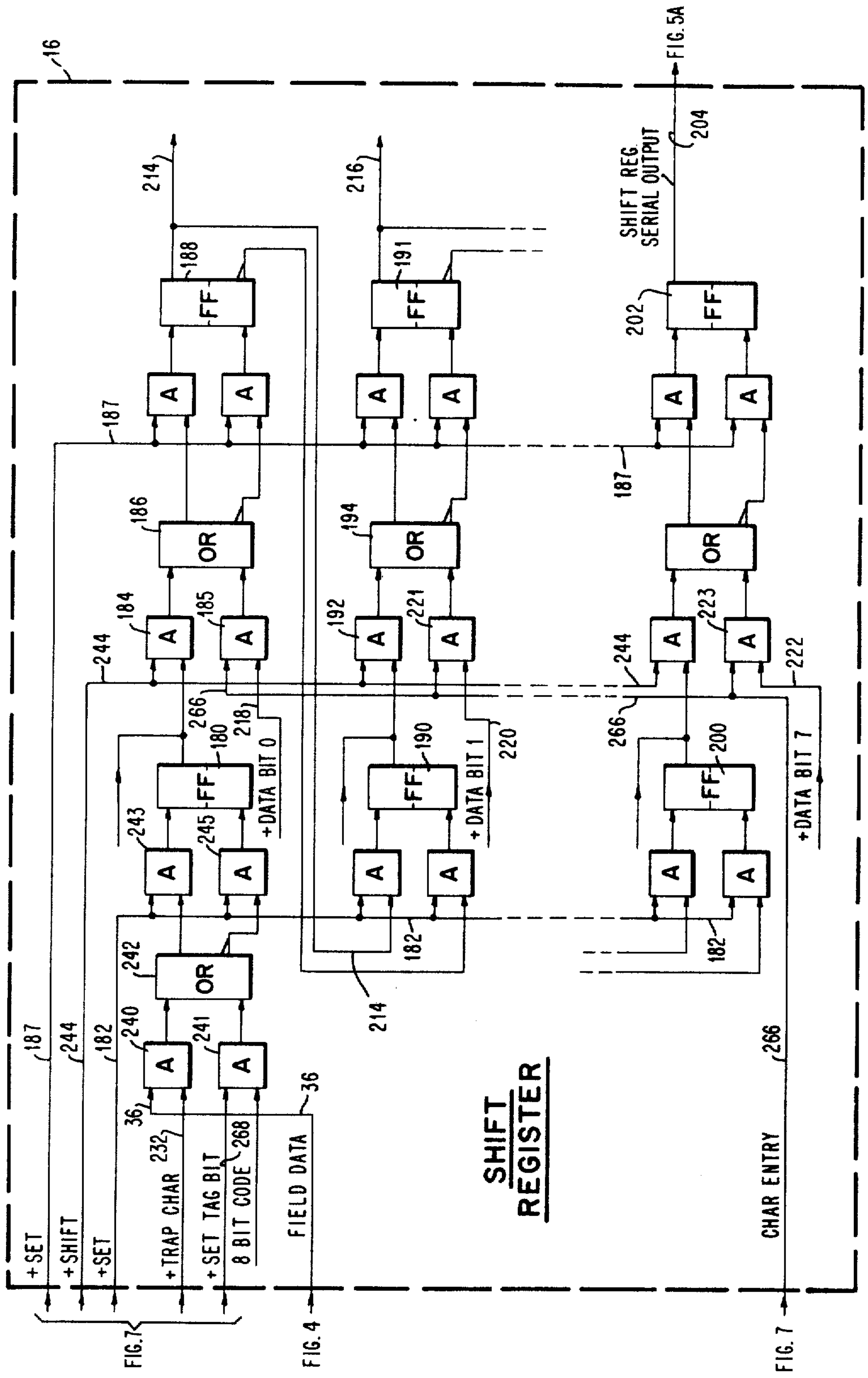
FIG. 6 is a circuit diagram of the shift register.

In the receive mode, i.e. receiving of data from loop which occurs during the ODD cycle, and AND circuit 231 is enabled at time T5 to set the device 230 which provides a signal on line 232 to the shift register to allow data from the shift register to pass through AND circuit 240, FIG. 6.

Referring once again in FIG. 7, the negative output of device 230 is coupled through a negative OR circuit 234 to enable AND circuit 236 at third quarter time and set bistable device 242 is reset by AND 243 responsive to the output of inverter 241. The device 242 provides a shift output 244 which is also gated at first quarter time by AND circuit 246 to provide a set output 187.

The function of the signal on line 182 is to enable the transfer of data into stage 0 of the delay line and from devices 188, 191 . . . 202 to devices 190 . . . 200 at third quarter time. The function of the shift line 244 is to shift data from the devices 180, 190 . . . 200 (eight in number) to the devices 188, 191 . . . 202. The function of the set line 187 is to time the transfer between devices 180–188, 190–191 . . . 200–202 at first quarter time.

In the receiving of data from the delay line, the indicia in the bit position control enables an AND circuit 162, 164 . . . 174, FIG. 7, to reset the device 230 and drop the output to the shift register. When the output drops the data is staticized in the shift register stages 188, 191 . . . 204 and provides the output at 214, 216 . . . 204 to the processor.

In the receipt of data from the processor a signal on line 266, that the character is available, is applied to AND 267 to provide the set output signal on line 187. The character entry signal of 266 is applied, FIG. 6, to the shift register to condition AND circuits 185, 221 . . . 223 to receive data on lines 218, 220 . . . 222 to be set into the devices 188, 191 . . . 202.

Entry of this data into the delay line is made on even cycles. On an even cycle, the AND circuit 260 provides a negative input to the negative inverter 263 to provide a tag bit set into the device 180. The tag bit is the last bit contained in the register and is shifted through register 16 until the same is in device 202, FIG. 6. The presence of the tag bit "binary 1" in any stage but stage 200–202 prevents and AND circuit 277 from resetting the device 269. The inputs to AND 277 are not shown specifically but are logically connected to provide an output in the absence of any set device in register 16 except the last. The enabling of the shift register to read data from the shift register into the delay line through the write control is effected by the setting of device 269 in an even cycle and applying the negative signal to OR 234. The times of initiating the transfer of the data are specified by the output of OR 176 as described previously.

The output of the shift register 204 is applied to AND circuit 206, FIG. 5A, which is coupled through OR circuit 74 into the write delay logic at the correct time.

Figure 3:
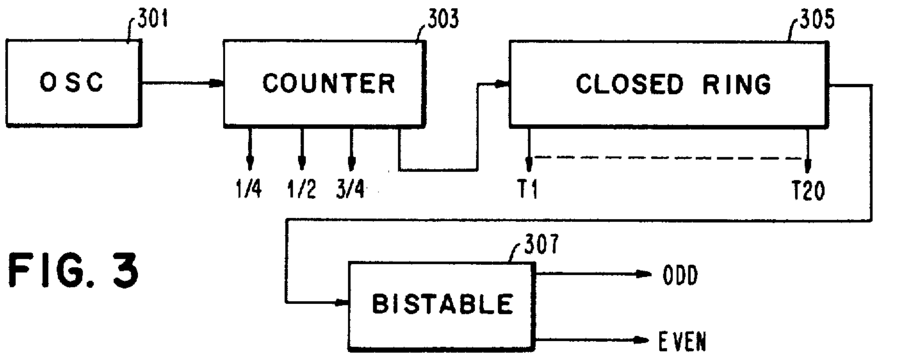
FIG. 3 is a circuit diagram of the timing pulse generating apparatus used in the invention.

FIG. 3 illustrates the timing base for the present invention. An oscillator 301 applies its output to a counter 303 which after four counts applies an output to a closed ring 305. The ring 305 is continuously driven while at T20 the same applies a pulse to a bistable device 307 which is set and reset on alternate cycles of ring 305 to indicate odd and even cycles.

We claim:

1. A data transfer apparatus including a data storage loop in which units of data are continuously transferred through a fixed data path so that units of data are sequentially available at a reference point within said apparatus;

a time base generator for generating sequential timing signals each referable to sequential instants of time at which individual units of data will become available at said reference point, said sequential instants of time being thus equated to data positions within said storage loop;

unit shifting means included in said storage loop for shifting said units of data with reference to said data positions whereby units of data are made available in required data positions;

unit position indicator means for reflecting the location of said units of data within said data positions;

means responsive to a request for unit data transfer for initiating a shifting operation and for modifying said unit position indicator;

a shifting register connected to said storage loop to parallel a portion thereof, said register containing a plurality of storage positions for said units of data and being connected to said storage loop to selectively receive sequential data from said loop and shift the same through sequential storage posititions and to selectively transfer data sequentially to said loop from sequential positions of storage control;

means forming part of said shifting register, to disable said shifting operation in response to the unit position indicator to staticize a sequential plurality of units of data, and to enable said shifting operation in response to the unit position indicator to transfer a plurality of units of data into said data storage loop to a predetermined set of data positions whereby pluralities of units of data may be transferred.

2. The apparatus of claim 1 wherein said storage loop includes:

a dynamic storage device into which units of data are recorded and subsequently read therefrom;

a staticizing register for receiving data from said loop; and a write control means for receiving data from said staticizing register and recording the same in said device.

3. The apparatus of claim 2 wherein:

said unit shifting means forms a portion of said write control means, said unit shifting means including a plurality of delay units forming a normal no-shift path for data being circulated in said storage loop;

and means forming a part of said write control means being responsive to a shift control signal for eliminating a number of said delay units.

4. The apparatus of claim 3 wherein:

said means for modifying said unit position indicator includes logic circuitry for detecting the unit position indicator and a request for unit data transfer;

said means for modifying being included in said write control means and being timed to provide a modified unit position indicator at the required write time to introduce the modified indicator into the data stream at the required location.

5. The apparatus of claim 4 wherein:

said shifting register is normally operated to receive data from said storage device during the time periods in which data is read from said device and to shift said data in time through the stages of said register and means responsive to the unit position indicator for disabling said shifting operation when the plurality of units of data to be transferred are standing in the stages of said register.

6. The apparatus of claim 5 wherein:

means is provided to enter a plurality of units of data into said register simultaneously and means forming a portion of said control circuitry for said shift register for enabling said shift register at a time corresponding to the data position within said storage loop in which data is to be entered, for shifting data from said register into said storage loop.

7. A data transfer apparatus including:

a delay line for receiving incoming units of data at an input and transferring the same to an output wherein units of data are stored for a time duration dependent on the length of said delay line;

a base register for receiving said units of data from the output of said delay line and staticizing a plurality of these units;

a base write control for receiving individual units of data from said base register and applying the same to the input of said delay line;

a time base generator for generating sequential time signals in time with the appearance of units of data at the output of said delay line wherein the data position of units of data being circulated within said delay line may be fixed;

said sequential time signals being applied to the base write control to record units of data at the data positions in said recirculating loop corresponding to the positions from which said individual units were read;

a plurality of data positions in said recirculating data loop comprising a unit position indicator denoting the location of data within said data positions;

a shift register connected to the output of said delay line to receive data therefrom simultaneously with the receipt of data in said base register, said shift register being connected in parallel to said base register;

said shift register including an output connected to said base write control whereby data contained in said shift register may be entered into said delay line;

said shift register further including circuitry therein for effecting a parallel transfer of data between said register and an outside source;

unit shifting means included in said write control for shortening in time the data transfer path whereby data being recorded in said delay line may be shifted in time to record data in a different data position; and means responsive to a request for a transfer of a unit of data between said apparatus and some peripheral unit for shifting said data with said apparatus and modifying said unit position indicator.

8. The apparatus of claim 7 wherein:

said unit shifting means includes a plurality of delay units forming a normal no-shift path for data being circulated in said storage loop; and means forming a part of said write control means responsive to a shift control signal for eliminating a number of said delay units in said storage loop.

9. The apparatus of claim 8 wherein:

said means for modifying said unit position indicator includes logic circuitry for detecting the unit position indicator and a request for unit data transfer;

said means for modifying included in said write control means, and being timed to provide a modified unit position indicator at the required write time to introduce the modified indicator into the data stream at the required location.

10. The apparatus of claim 9 wherein:

said shifting register is normally operated to receive data from said storage device during the time periods in which data is read from said device, and to shift said data in time through the stages of said register; and means responsive to the unit position indicator for disabling said shifting operation when the plurality of units of data to be transferred are standing in the stages of said register.

11. The apparatus of claim 10 wherein:

means is provided to enter a plurality of units of data into said register simultaneously; and means forming a portion of said control circuitry for said shift register for enabling said shift register at a time corresponding to the data position within said storage loop in which data is to be entered for shifting data from said register into said storage loop.

References Cited

UNITED STATES PATENTS

| | | | |
|---|---|---|---|
| 3,153,776 | 10/1964 | Schwartz | 340—172.5 |
| 3,328,772 | 6/1967 | Oeters | 340—172.5 |
| 3,350,697 | 10/1967 | Hirvela | 340—172.5 |

RAULFE B. ZACHE, Primary Examiner